United States Patent
Chan

(10) Patent No.: US 6,665,447 B1
(45) Date of Patent: Dec. 16, 2003

(54) METHOD FOR ENHANCING IMAGE DATA BY SHARPENING

(75) Inventor: San San Chan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/360,541

(22) Filed: Jul. 26, 1999

(51) Int. Cl.$^7$ ................................................. G06K 9/40
(52) U.S. Cl. ........................ 382/254; 382/263; 382/264
(58) Field of Search ................................ 382/254, 266, 382/271, 272, 275, 280, 263, 264, 260; 358/447, 448, 452, 465

(56) References Cited

U.S. PATENT DOCUMENTS

| | | | | |
|---|---|---|---|---|
| 4,783,840 A | * | 11/1988 | Song | ........................... 382/54 |
| 6,002,407 A | * | 12/1999 | Fadden | ........................ 345/430 |

OTHER PUBLICATIONS

Jain A.K.: "Fundamentals Of Digital Image Processing", 1989, Prentice–Hall, New Jersey, USA XP002185234 *p. 249–250, section entitled "Unsharp Masking and Crispening" ** p. 264, point 7.5*.

Scognamiglio G et al: "Picture Enhancement In Video And Block–Coded Image Sequences" International Conference on Consumer Electronics, Los Angeles, CA, Jun. 22–24, 1999 and IEEE Transactions On Consumer Electronics, IEEE Inc. New York,US, Aug. 1999 vol. 45,No. 3, pp. 680–689,XP000926984, ISSN: 0098–3063.

* cited by examiner

*Primary Examiner*—Jerome Grant, II

(57) ABSTRACT

A process for enhancing a decompressed JPEG image data defined by a two-dimensional array of pixel values is disclosed. The enhancement involves sharpening real objects in the image and avoids the sharpening of compression artifacts. The process includes selecting a first pixel value to be enhanced, a group of pixel values surrounding the first pixel from the array of pixel values, and a threshold value. The first pixel value is changed to an enhanced value by first taking the differences in pixel values between each pixel value in the group and the first pixel. These differences in values are compared with the threshold value. Those differences in values that exceed the threshold value are then used to calculate the enhanced value. More specifically, the enhanced value is given by the sum of a scaled average of the differences in values and the original pixel value.

11 Claims, 1 Drawing Sheet

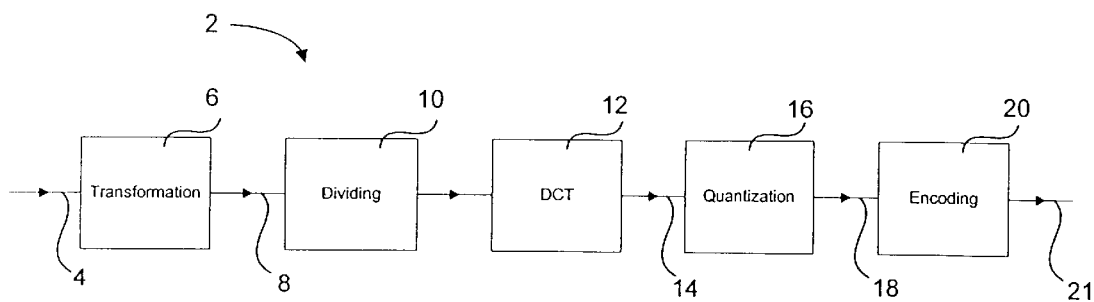
FIGURE 1
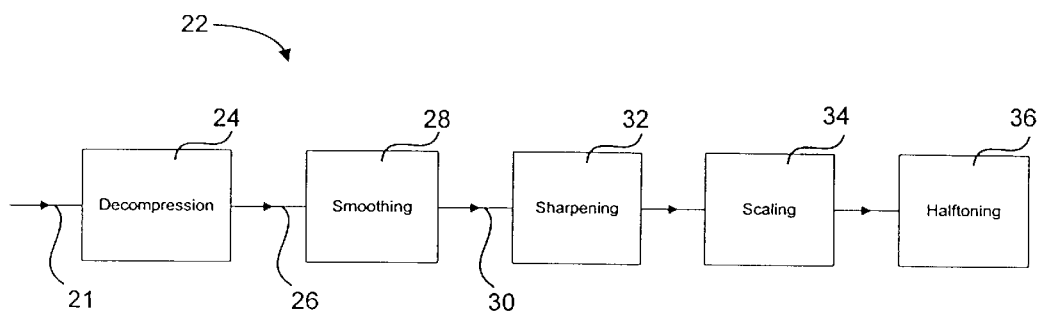
FIGURE 2
| p(1) | p(2) | p(3) | p(4) | p(5) |
|------|------|------|------|------|
| p(6) | p(7) | p(8) | p(9) | p(10) |
| p(11) | p(12) | X | p(13) | p(14) |
| p(15) | p(16) | p(17) | p(18) | p(19) |
| p(20) | p(21) | p(22) | p(23) | p(24) |
FIGURE 3

METHOD FOR ENHANCING IMAGE DATA BY SHARPENING

FIELD OF INVENTION

This invention relates to a method for enhancing image data by sharpening. More particularly, this invention relates to a method for enhancing by sharpening raw image data, such as a JPEG decompressed image data.

BACKGROUND

Image data file compression can be divided into two types, "non-lossy" and "lossy". A "non-lossy" compression method implies that there is no loss of image quality. This method however does not afford much decrease in image data size. In a "lossy" method, data is shed resulting in a smaller image data size at the expense of image quality. One such compression method is the JPEG compression standard. JPEG is developed by the Joint Photographic Experts Group and hence the abbreviation.

In JPEG compression, the amount of compression applied to an image data or image file can be varied. The amount of compression determines the quality of the compressed image. A compression index of 1:4 results in an image of reasonably good quality and a compression index of 1:28 results in an image of rather poor quality. A reproduction of an image compressed with a compression index of 1:28 will contain compression artifacts. These artifacts are unnatural elements or distortions in the reproduction of the compressed image. The reproduced image tends to contain blocky image artifacts. JPEG compression is also likely to produce mushy areas that lack sharpness, especially obvious in the flat areas of an image, overemphasized edges and unnatural color distribution in the image.

The amount of memory available in consumer products such as digital cameras, photo scanners and digital recorders for capturing JPEG images is usually limited by cost. Images captured on such products are usually JPEG compressed to a resolution of 640×480 pixels. On reproduction of such an image on a printer, smoothing of the image inevitably occurs. Smoothing effectively blurs an image, resulting in an image of reduced quality. Smoothing can occur at different stages in a reproduction process. One such stage is during the scaling of an image. Scaling occurs when a 640×680 pixel image is printed to a size of 5×3.5 inches on a 300 dot-per-inch (dpi) printer. The original image needs to be scaled to an image of a resolution of 1500×1050 pixels. This scaling effectively smoothes the image. In inkjet printers where a halftoning process is used to enable the inkjet printer to print many different colors based on a limited number of available inks, extensive smoothing further occurs. In an attempt by using low-pass filtering to reduce artifacts that result from JPEG compression, further smoothing of real objects in an image also occurs. As far as compression artifacts are concerned, smoothing is advantageous in reducing artifacts.

To enhance the quality of smoothed images, a sharpening step or process is performed on the smoothed images. Currently available sharpening processes, such as by performing high pass filtering, creates a ringing effect around edges, making the edges look jagged. The processes also highlight artifacts from the compression process, especially in flat regions such as a human face or a wall. The reason for this highlighting is that the sharpening process cannot differentiate between real object edges and those of compression artifacts. These sharpening processes cancel the effects of smoothing of compression artifacts. The smoothing of compression artifacts and the sharpening of real image edges using existing sharpening processes are inherently contradictory since any smoothed artifacts will reappear upon sharpening.

There is another disadvantage associated with existing sharpening processes. These sharpening processes are usually computationally intensive. Most existing processes include finding a low-pass value of an image data. These processes then negate this low-pass value to get a high-pass residue or data. These processes next enhance the high-pass data before adding the high-pass data back to the original image data. Such processes require two passes over the image data, a first pass to obtain the high-pass data and a second pass to enhance the original image. Most consumer printers would not have the memory or processing capability to support such two-pass sharpening processes.

The foregoing therefore creates the need for a single-pass sharpening process for enhancing a JPEG decompressed image, the single-pass sharpening process is less computationally demanding than a two-pass process. This sharpening process should preferably also sharpen objects that resemble real objects and avoid sharpening of compression artifacts. It is also an object for the process to be a pipelined process in which sharpening can proceed with a partially available image data.

SUMMARY

The present invention provides a process for enhancing image data defined by a two-dimensional array of pixel values. The process includes selecting a first pixel value to be enhanced and a group of pixel values surrounding the first pixel value from the array of pixel. The first pixel value is changed to an enhanced second pixel value by first taking differences in pixel values between each pixel value in the selected group and the first pixel value. These differences in values or value differences are compared with a threshold value. Those value differences which exceed the threshold value are then used to determine the enhanced second pixel value.

BRIEF DESCRIPTION OF DRAWINGS

The invention will be better understood with reference to the drawings, in which:

FIG. 1 is a block diagram of steps in a JPEG compression process.

FIG. 2 is a block diagram of steps in a reproduction process for reproducing a JPEG compressed image on an inkjet printer of which a sharpening process according to the present invention is a part of.

FIG. 3 is a plan view of a 5×5 pixel window containing a pixel value to be enhanced and its surrounding pixel values used in the sharpening process in FIG. 2.

DETAILED DESCRIPTION OF THE PREFERRED EMBODIMENT

The invention is described using a preferred embodiment for sharpening a decompressed JPEG color image. It should be noted that the invention could also be used to sharpen any raw images, such as decompressed JPEG gray-scale images.

FIG. 1 is a block diagram showing a JPEG compression process 2. An image, which is represented by an array of 24-bit pixels, is shown as an input to the JPEG compression process. An arrow 4 in FIG. 1 indicates this input. This 24-bit data is first transformed into a suitable color space in a TRANSFORMATION step 6. The RGB data in the 24-bit data is transformed into a transformation output data indicated by an arrow 8. This data is defined by a luminance-and-chrominance color space, commonly known as YCbCr. The luminance component Y is grayscale and the other two components, Cb and Cr, contain color information. The human eye is not as sensitive to high-frequency chrominance information as it is to high-frequency luminance information. Therefore, the compression process can afford to lose a lot more information in the chrominance components than in the luminance component. The amount of compression of each of these components can be independently selected.

In the description which follows, only compression of the luminance information is described. Following the transformation of the image data into YCbCr format, the JPEG compression process 2 divides the image into 8×8 pixel blocks in a DIVIDE step 10. The process 2 then calculates a discrete cosine transform (DCT) of each of these blocks in a DCT step 12. The DCT output, as indicated by an arrow 14, gives a frequency map with 64 frequency components. From these 64 frequency components, an average value and successively higher-frequency changes can be identified in each block. As the human eye is less sensitive to high-frequency information, the high-frequency information can be discarded without adversely affecting low-frequency information. The DCT-transformed data is next quantised in a QUANTIZATION step 16, using a 64-element quantization table or matrix. Each element of this quantization table contains a quantization step size for quantizing each of the 64 frequency components. Quantization step sizes are small for low-frequency components and large for high-frequency components. Each DCT component or coefficient is divided by its corresponding quantization step size or quantum and then the result is rounded to a nearest integer. Large quanta thus drive small coefficients down to zero. This QUANTIZATION step 16 results in many high-frequency components becoming zero.

Tuning the quantization table for best results is something of a black art, and is a subject for active research. Generally, a single user-specified "quality" setting is used to scale the values of example tables given in the JPEG standard. Such scaling works fairly well for midrange qualities (not too far from the example tables themselves) but is not optimal at very high or low quality settings.

The quantized values, as indicated by an arrow 18, are then encoded using a compression algorithm in an ENCODING step 20. One such applicable compression algorithm is called Huffman coding. Appropriate headers are tacked to the encoded data. The headers contain parameters which include the quantization tables and Huffman coding tables. These tables are included so that a subsequent decompression process can reverse the compression process to reproduce the image.

FIG. 2 is a block diagram showing an image reproduction process 22 in which the sharpening process according to the present invention is a part of. This image reproduction process 22 is suitable for implementation in an inkjet printer. The first step in this reproduction process is a DECOMPRESSION step 24. This DECOMPRESSION step 24 essentially reverses the compression process 2. The quantized DCT coefficients are recovered from the compressed data stream 21 by multiplying the reduced coefficients by the quantization table entries to produce approximate DCT components. Since these DCT components are only approximate, the reconstructed pixel values as indicated by an arrow 26, are also approximate. This DECOMPRESSION step 24 is usually followed by a SMOOTHING step 28. In the SMOOTHING step 28, the reconstructed or decompressed data 26 is smoothed to reduce pixel-to-pixel discontinuities.

The smoothed data, as indicated by an arrow 30, is next sharpened in a SHARPENING step 32. In this step 32, a single-pass sharpening process according to the present invention is used to sharpen edges in the image. This sharpening algorithm will be described in more detail shortly. After sharpening, the data is optionally scaled in a SCALING step 34. Following this optional SCALING step 34, the data is halftoned in a HALFTONING step 36. Halftoning uses a spatial representation of pixels of different shades to simulate a color or gray level, typically to approximate the desired color or gray level on a device that cannot represent the color or gray level directly. The halftoned data is then used in a print engine of the inkjet printer for printing. Halftoning usually requires image data to be represented in a CMYK format. Conversion of image data from YCrCb to this CMYK format is well known to those skilled in the art.

The sharpening algorithm used in the SHARPENING step 32 is now described in detail. The input to this sharpening step is a two-dimensional array of pixel values. In this preferred embodiment, the two-dimensional array of pixel values defines a smoothed image from the preceding SMOOTHING step 28. This smoothed image contains JPEG compression artifacts as previously described. Each pixel data in the two-dimensional array is a luminance and chrominance value, YCbCr. This algorithm operates on but is not limited to the luminance component Y. The objective of this sharpening step is to sharpen real objects in the image and to avoid the sharpening of JPEG compression artifacts. The algorithm takes the luminance component of. each pixel value to be enhanced in this two-dimensional array and calculates an enhanced value for the pixel. This enhanced value is dependent on luminance components of pixel values surrounding the pixel value to be enhanced. A sliding window is used to define the pixel value to be enhanced and its surrounding pixel values. FIG. 3 is a plan view showing a group or window of pixel values in the two-dimensional array. This sliding window covers but is not limited to a 5×5 array of pixel values. The dimensions of the window are selected depending on the overall size of the image and types of objects in the image. It was empirically found that a 5×5 array is suitable for most types of images. The algorithm does not require the entire pixel values of an image to be available for processing. Once a sliding-window-full of pixel values is available, the sharpening algorithm can be started.

In the window of FIG. 3, the pixel value to be enhanced is the pixel in the center having a value of x. For a 5×5 array of pixel values, there are twenty-four neighboring pixel values, $p(1)-p(24)$, surrounding the pixel value to be enhanced. For each of these neighboring pixel values, a delta value is calculated according to the formula given below:

$$\text{delta}=[X-p(i)]*\text{GAIN},$$

where i is an integer between 1 and 24

Twenty-four such delta values would be calculated for a 5×5 sliding window. Each of these delta values is than compared with a THRESHOLD value. The delta values which are greater than the THRESHOLD value are identified as contributing to the enhanced value of the pixel value X. Those delta values which are the same or lower than the THRESHOLD value are considered as unimportant in the calculation of the enhanced value. These unimportant delta values are discarded. Pixels whose pixel values are of almost the same texture as the pixel to be enhanced will result in unimportant delta values. The enhanced value is stored in a result array. The pseudo code for an implementation of the above-described sharpening algorithm is given below:

PSEUDO CODE 1

```
for (i=1; i<= 24; i++)
{
    delta(i) = (X-p(i))*GAIN;
    if (|delta(i)| > THRESHOLD)
        /* delta for pixel is considered as contributing */
        y(i) = X + delta(i);
    else
        /*delta for pixel is considered unimportant */
        y(i) = X;
}
for (i=1; i <=24; i++)
    sum = sum + y(i);
Y = sum/24;    /* enhanced value of pixel X */
```

The above sharpening algorithm is applied to each pixel value in the 2-dimensional array by shifting the sliding window to select a new pixel value to be enhanced and a new set of neighboring pixels. Pixel values located along the fringe of an image do not have a complete set of neighboring pixels. For such pixel values, only neighboring pixel values which are enclosed by the sliding window are considered in the determination of an enhanced value.

The value of GAIN in the above pseudo code is selected depending on the amount of sharpening required. The amount of sharpening is dependent on the image. Different GAIN values produce different enhancement effects on different images. As the printer is unable to differentiate the contents of an image, the selection of the GAIN value is usually empirically determined and set as a default value. A suitable GAIN value is between the range 1.0 to 2.0. Alternatively, this GAIN value may be a function of the "quality" setting which is used to scale quantization step sizes in the quantization matrix during JPEG compression. The THRESHOLD value may be similarly determined.

The preferred embodiment performs sharpening using only the luminance information. However, as in the JPEG standard, sharpening can be performed on the chrominance information if necessary.

It will also be apparent to those skilled in the art that variations to the pseudo code in the calculation of the enhanced value are possible. As an example, the following pseudo code achieves essentially a same end result as the earlier presented pseudo code.

PSEUDO CODE 2

```
for (i=1; i<= 24; i++)
{
    delta = X-p(i);
    if (|delta| > THRESHOLD2)  /* THRESHOLD2 = THRESHOLD/GAIN */
    {   /* delta for pixel is contributing */
        sum = sum + delta;
    }
}
Y = X + sum*GAIN/24; /* new value of X */
```

As another example with reference to the above pseudo code, the enhanced value Y may be calculated with sum*GAIN divided by a different number, such as the number of delta values that exceed THRESHOLD2.

I claim:

1. A process for enhancing a pixel value in an image data defined by a two dimensional array of pixel values comprising the steps of:
    selecting a first pixel value to be enhanced from the array of pixel values;
    selecting a group of pixel values surrounding the first pixel value; and
    changing the first pixel value to an enhanced second pixel value as a function of differences in values between each of the pixel values in the selected group and the first pixel value, the differences in values are to exceed a threshold value; wherein the image data comprises decompressed JPEG image data which contains JPEG compression artifacts and wherein the threshold value is selected to avoid enhancing the JPEG compression artifacts.

2. A process for enhancing a pixel value according to claim 1, wherein the step of changing the first pixel value to an enhance second pixel value comprises the steps of:
    scaling differences in values between each of the pixel values in the selected group and the first pixel value by again value;
    identifying scaled difference values which exceed a threshold value; and
    adding an average of the identified difference values to the first pixel value to give the enhanced second pixel value.

3. A process for enhancing a pixel value according to claim 1, wherein the threshold value is selected based on a scaling value which is used in determining quantization step sizes for a quantization matrix in a JPEG compression process.

4. A process for enhancing a pixel value in an image data defined by a two-dimensional array of pixel values comprising the steps of:
    selecting a first pixel value to be enhanced, X, from the array of pixel values;
    selecting a group of pixel values each identified by p(i), surrounding the first pixel value, X, from the array of pixel values;
    selecting each pixel value p(i) from the group of pixel values to calculate a scaled difference in pixel values between the selected pixel value, p(i), and the first pixel value, X, until scaled difference values have been calculated for substantially all pixel values in the selected group of pixel values, the scaled difference in pixel values being given by a formula (X−p(i)*GAIN, where GAIN is a scaling factor;
    identifying scaled difference values whose magnitudes exceed a threshold value,THRESHOLD; and
    deriving an enhanced second pixel value for the first pixel value, X, by adding an average of the identified scaled difference values to the first pixel value, X.

5. A process for enhancing a pixel value according to claim 4, wherein the average of the identified scaled difference values is taken over substantially the number of pixel values in the selected group of pixel values.

6. A program storage device readable by a computing device, tangibly embodying a program of instructions, executable by the computing device to perform the method steps for enhancing a pixel value in an image data defined by a two-dimensional array of pixel values, the method comprising the steps of:
    selecting a first pixel value to be enhanced from the array of pixel values;

selecting a group of pixel values surrounding the first pixel; and changing the first pixel value to an enhanced second pixel value as a function of differences in values between each of the pixel values in the selected group and the first pixel value, the difference in values are to exceed a threshold value;

wherein the image data comprises decompressed JPEG image data which contains JPEG compression artifacts and wherein the threshold value is selected to avoid enhancing the JPEG compression artifacts.

7. A program storage device according to claim 6 wherein the step of changing the first pixel value to an enhanced second pixel value comprises the steps of:

scaling differences in values between each of the pixel values in the selected group and the first pixel value by a gain value;

identifying scaled difference values which exceed the threshold value; and adding an average of the identified difference values to the first pixel value to give the enhanced second pixel value.

8. A program storage device according to claim 6, wherein the threshold value is selected based on a scaling value which is used in determining quantization step sizes for a quantization matrix in a JPEG compression process.

9. A method for sharpeninig a decompressed JPEG color image, comprising:

decompressing image values which have been previously transformed, divided, discret-cosine-transformed, quantized, and encoded with headers that include quantization tables and coding tables to recover a set of reconstructed pixel values;

smoothing data obtained in the step of decompressing to reduce pixel-to-pixel discontinuities;

sharpening in a single pass the data obtained in the step of smoothing;

halftoning data derived from the step of sharpening; and forwarding the data obtained in the step of halftoning for an inkjet print engine.

10. The method of claim 9, wherein the step of sharpening further comprises:

receiving a two-dimensional array of pixel values of a smoothing image from the step of smoothing and that includes JPEG compression artifacts;

processing to sharpen real objects in said two-dimensional array of pixel values while avoiding said JPEG compression artifacts by calculating pixel-by-pixel an enhanced value for a luminance component that is dependent on each of its surrounding pixel values if the particular pixel value exceeds a threshold value; and amplifying said enhanced value for each said luminance component by an empirically determined gain value.

11. A method of sharpening image pixels for a printer, comprising:

receiving a two-dimensional array of pixel values of a smoothing image from a smoothing process that included JPEG compression artifacts;

processing to sharpen real objects in said two-dimensional array of pixel values while avoiding said JPEG compression artifacts by calculating pixel-by-pixel an enhanced value for a luminance component that is dependent on each of its surrounding pixel values if the particular pixel value exceeds a threshold value;

amplifying said enhanced value for each said luminance component by an empirically determined gain value; and halftoning data obtainied in the step of amplifying for use by an inkjet print engine.

* * * * *